United States Patent [19]

Browne

[11] Patent Number: 4,757,928

[45] Date of Patent: Jul. 19, 1988

[54] BASKET AND METHOD FOR HANGING THE BASKET ON THE REAR SIDE OF A VEHICULAR SEAT

[76] Inventor: Donald V. Browne, Star Rte., Box 1, Colorado City, Tex. 79512

[21] Appl. No.: 48,771

[22] Filed: May 12, 1987

[51] Int. Cl.⁴ .............................................. B60R 27/00
[52] U.S. Cl. .................................................... 224/275
[58] Field of Search ............ 224/275, 277, 279, 42.42, 224/42.43, 42.45 R, 42.46 R; 206/562, 217, 216; 220/1 T, 23; 108/44; 297/188, 191; 296/37.16, 37.8, 37.15, 37.1; 312/235 A; 248/311.2, 503

[56] References Cited

U.S. PATENT DOCUMENTS

| | | | |
|---|---|---|---|
| 2,507,842 | 5/1950 | Waddill | 224/42.46 R |
| 2,645,392 | 7/1953 | Gottsegen et al. | 224/275 X |
| 2,767,895 | 10/1956 | Smith | 224/275 |
| 2,932,544 | 4/1960 | Lambert | 224/275 X |
| 3,088,771 | 5/1963 | Weigle | 296/37.5 |
| 3,414,157 | 12/1968 | Wright | 224/277 X |
| 3,690,446 | 9/1972 | Spainhour et al. | 206/525 |
| 3,828,994 | 8/1974 | Hollins | 224/275 |
| 4,466,659 | 8/1984 | Carpentier et al. | 297/191 |
| 4,619,386 | 10/1986 | Richardson | 224/277 |
| 4,681,366 | 7/1987 | Lobanoff | 297/191 |

FOREIGN PATENT DOCUMENTS

| | | |
|---|---|---|
| 2008672 | 9/1971 | Fed. Rep. of Germany ... 296/37.15 |
| 3409097 | 11/1984 | Fed. Rep. of Germany ...... 297/191 |

Primary Examiner—Henry J. Recla
Assistant Examiner—Ernest G. Cusick
Attorney, Agent, or Firm—Wendell Coffee

[57] ABSTRACT

A litter basket is strapped to the rear side of the front seat of an automobile by passing the strap around the post of the head rest. Cup holders in the lid of the basket provide easy access to beverage containers therein.

11 Claims, 2 Drawing Sheets

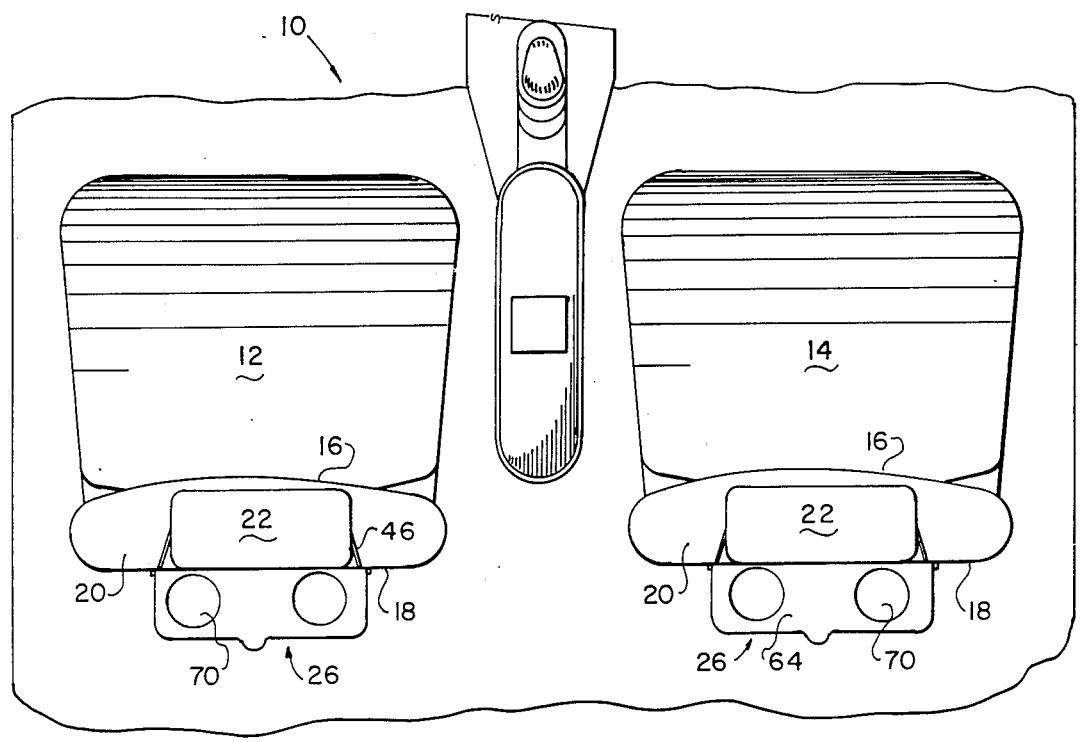
FIG-1
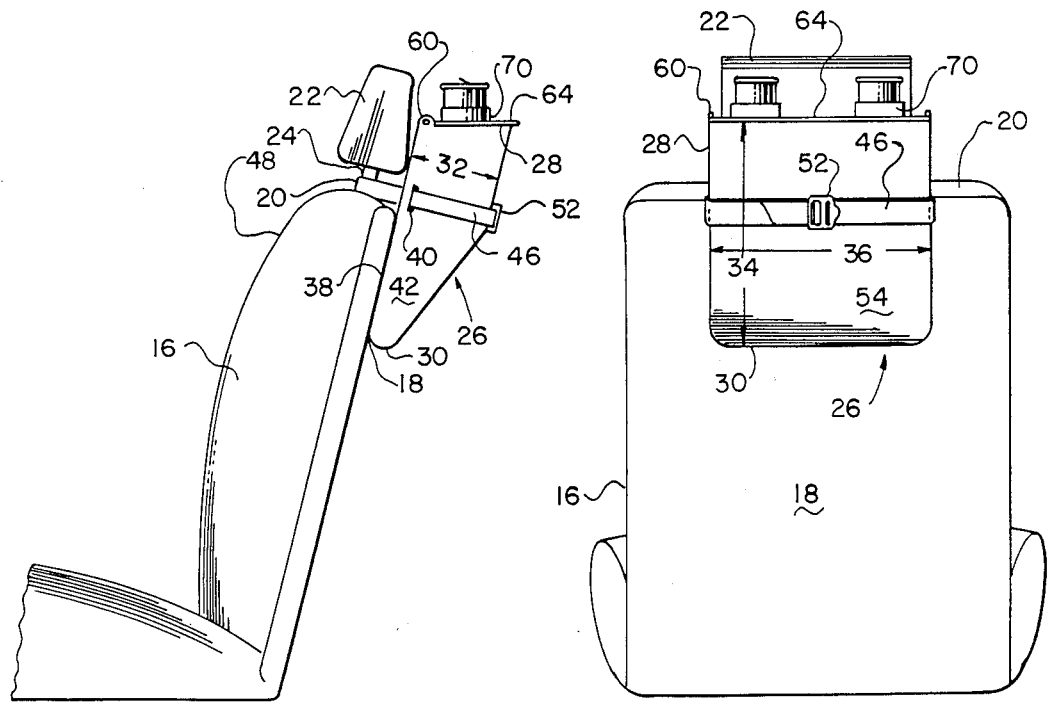
FIG-2
FIG-3

BASKET AND METHOD FOR HANGING THE BASKET ON THE REAR SIDE OF A VEHICULAR SEAT

BACKGROUND OF THE INVENTION

1. Field of the Invention

This invention relates to litter containers, and more particularly to litter baskets for use in automobiles.

2. Description of the Related Art

The following United States patents show the importance and desirability of litter baskets in automobiles is recognized.

| Inventor | U.S. Pat. No. |
| --- | --- |
| E. M. Trammell, Jr. | 3,504,830 |
| E. M. Trammell, Jr. | 3,547,326 |

Furthermore, the following United States patents show the desirability of having the litter baskets attached to the rear side of the front seat of an automobile is recognized.

| Inventor | U.S. Pat. No. |
| --- | --- |
| N. C. Waddill | 2,507,842 |
| B. Weigle | 3,088,771 |
| Spainhour et al. | 3,690,446 |

Weigle discloses a modified front seat so that the litter container is built into the back of the front seat. Waddill and Spainhour both describe a litter container that hangs over the top of the front seat and requires hooks or the like to attach the litter container to the seat.

At the present time, the front seats of all automobiles are required to have head rests as a safety measure. Normally, head rests are mounted on posts so that they may be adjusted for people having different heights.

People on long trips find it convenient to have beverage containers in the car while they are driving. Often, people carry thermos jugs or a container of coffee or the like to have beverages while they drive. Most cars do not have provisions for beverage containers.

SUMMARY OF THE INVENTION

Progressive Contribution to the Art

The posts of a head rest of an automobile make an ideal place to attach a litter basket to the rear side of the front seat. There are no requirements of the modification of the automobile. With the litter basket in such a position, the lid on the top of the litter basket forms a convenient place to have beverage containers. The containers are within easy access of an occupant one of the front seats to reach behind the adjacent seat.

Objects of this Invention

An object of this invention is to provide a litter container for a vehicle.

Another object of this invention is to provide a combination litter container and beverage cup holder for an automobile.

Further objects are to achieve the above with devices that are sturdy, compact, durable, lightweight, simple, safe, efficient, versatile, ecologically compatible, energy conserving, and reliable, yet inexpensive and easy to manufacture, connect, adjust, and maintain.

Other objects are to achieve the above with a method that is rapid, versatile, ecologically compatible, energy conserving, efficient, and inexpensive, and does not require highly skilled people to connect, adjust, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a top plan view of the two front seats of an automobile, each having a litter basket according to this invention attached to the rear side thereof.

FIG. 2 is a side elevational view of the invention.

FIG. 3 is a rear elevational view of the invention.

Figure 4:
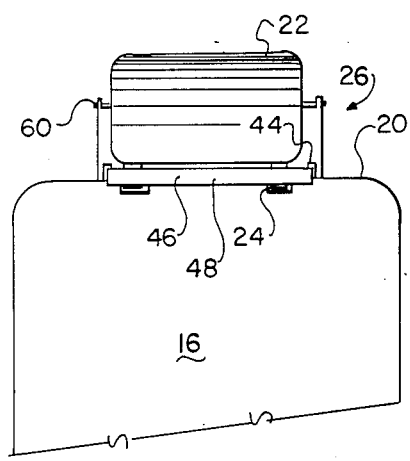
FIG. 4 is a front elevational view of a portion of one of the seats showing the invention.

As an aid to correlating the terms of the claims to the exemplary drawing, the following catalog of elements is provided:

| | |
| --- | --- |
| 10 automobile | 38 back side |
| 12 driver seat | 40 slots |
| 14 passenger seat | 42 sides |
| 16 upright portion | 44 back slots |
| 18 rear sided | 46 strap |
| 20 top | 48 bight |
| 22 head rest | 52 buckle |
| 24 post | 54 front |
| 26 basket | 56 liner |
| 28 open top | 60 ears |
| 30 closed bottom | 64 lid |
| 32 thickness | 70 cup shaped insert |
| 34 height | 72 bottom |
| 36 width | |

DESCRIPTION OF THE PREFERRED EMBODIMENT

Referring to the drawings, there may be seen represented portions of vehicle or automobile 10. The automobile will customarily have one driver seat 12 and one passenger seat 14. Each of the seats will have upright portion 16 which is sometimes called the back. The rear part of the upright portion 16 is called herein rear side 18.

Upright portion 16 will also have top 20. Head rest 22 is on the top 20. Normally, the head rest is adjustable in heighth. To this end, it is supported by one or more posts 24.

Those with ordinary skill in the art will understand that the detailed description to this point describes what is old, well known, and commercially available upon the market.

This invention uses a litter container in the form of basket 26 which is strapped to the post 24. The basket will have open top 28 and closed bottom 30. As seen in the drawings, the upper portion or the top will be of a larger area than bottom 30. Also, the basket will have thickness 32, height 34, and width 36. It may be seen that the thickness will vary, being thicker toward the top. At a point about midway of the basket, it will taper so that the bottom half is tapered with lesser thickness than the top.

Back side 38 of the basket 26 will be a planer surface. It may be seen that the basket, even at its thickest portion, has a thickness 32 less than the basket height 34. Also, the thickness, even in the thickest part, has a thickness 32 less than the basket's width 36.

Slots 40 are cut in each of the sides 42 of the basket. Back slots 44 are cut in the back side 38 of the basket. Strap 46 is threaded through the slots to attach the basket by the strap 46 to the post 24. The path of the strap could be varied. I prefer that the strap have a single loop or bight 48 which extends around the posts and have the two ends of the strap tied together with buckle 52 in the center of front 54 of the basket.

It may be noted that the slots 40 and 44 are located so that the distance from the top 28 to the slots (and thus the strap 46) is more than ⅓ of the total heighth 34 of the basket. Therefore, it may be seen that the top 28 of the basket is behind and may bear against the rear side of the head rest 22. The bottom 30 of the basket will bear against the rear side 18 of the seat.

The preferred placement of the strap is so that the distance from the center of the strap to the top is about 40% of the total distance. The distance from the center of the strap to the bottom is about 60%.

It is desirable to have the top 28 at a location approximately the midpoint, top to bottom, of the rear side of the head rest 22. Also, it is preferred that the closed bottom 30 of the basket be above the normal knee position of a back seat passenger, if any. Therefore, with these more important limitations, it will normally be that the strap will be spaced downward at least ⅓ of the distance of the total heighth of the basket.

Obviously, the strap could be in the form of an elastic band or a spring. Furthermore, the post 24 could be considered the lower portion of the head rest 22.

The strap itself will rest upon the top 20 of the upright portion 16 of the seat.

Figure 5:
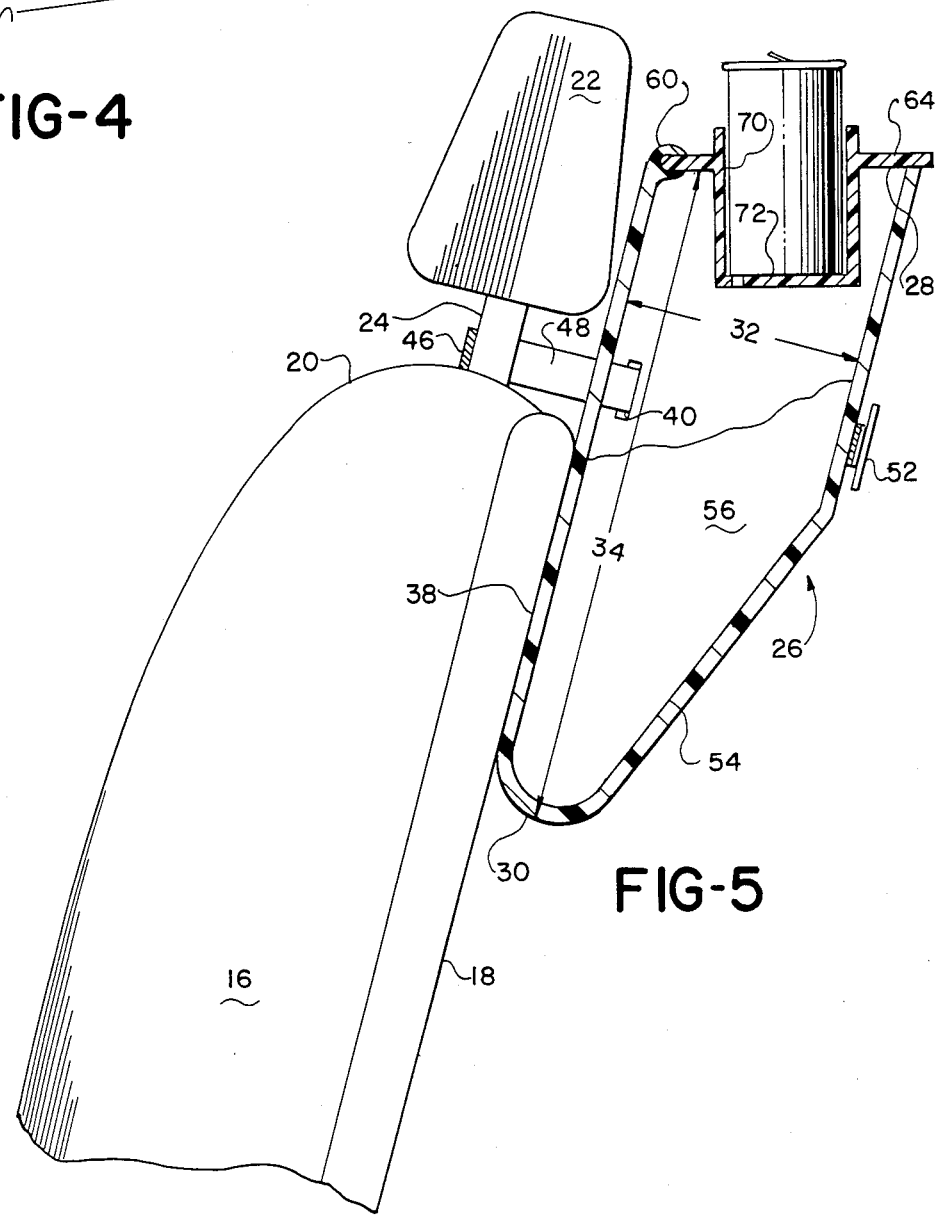
FIG. 5 is a side sectional view of the invention.

The basket 26 has liner 56 therein (shown broken in FIG. 5). Therefore, when it is desired to empty the basket, all that is necessary is to remove the liner 56 and dispose of it together with the litter therein.

Ears 60 are an extension of each side 42 adjacent to back side 38 of basket 26 as seen in the drawings. Each ear has a hole therethrough. Lid 64 has basically the same shape and size as the open top 28. The lid will have pintles projecting on each side through the holes in ears 60. The lid will normally have enough flexiblity so that the lid may be bowed sufficiently so the pintles may be placed through the holes.

Cup holders are placed in the lid 64. It is preferred that there be two cup holders in the lid, one on each side as shown. The cup holders may be as simple as circular openings so that a paper or styrofoam cup may be placed in the lid 64. However, it is preferred that the holders include a cup shaped insert 70 that extends partially inside of the basket and partially above the top of the lid 64. The bottom 72 of the cup shaped insert 70 will therefore enclose the litter within the basket 26 so that with the lid closed, the basket 26 is indeed closed and is not partially open as it would be if the cup holders were in the form of circular openings through the top.

It will be understood that the location of the bottom 72 of the cup shaped insert 70 is limited by the space or distance it projects into the basket. It needs to be located so that when the lid 64 is raised to put litter within the litter basket 26 that the bottom 72 does not block the rotation of the lid about its pintles within the ears 60. The insert 70 projecting about ¾" above and below the lid 64 seems to be adequate. FIG. 5 not being a scale drawing illustrates the maximum depth of the insert 70 and bottom 72 rather than the adequate depth.

It may be seen that with the lid closed, the lid is basically horizontal so that the liquid within beverage containers is maintained within the containers rather than sloshing out. Also, it may be seen that a person riding in the passenger seat 14 can readily reach behind the head rest 22 upon the driver's seat 12 to place a container in the cup holder 68 or remove one therefrom. Likewise, the driver, sitting in driver seat 12 can readily reach a cup in the cup holder on the basket 26 attached to the rear side of the passenger seat 14. The term "beverage container" is used, indicating that a can, such as a 12 oz. beverage can, could be placed in the holder as well as a cup.

Although the basket 26 is called a "litter" container, it will be understood that other items could be carried in the basket 26; for example, road maps, food, drink, or gloves.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A litter container mounted in an vehicle, said vehicle having:
   a. a front seat,
   b. a head rest having a lower portion on top of said front seat,
   c. the head rest and front seat each having a rear side, said litter container comprising:
   d. a basket having
      i. a height and width,
      ii. an open top and
      iii. a closed bottom, and
      iv. a thickness less than the basket's height and also less than the basket's width, and
   e. a strap attached to the basket between the top and bottom,
   f. said strap extending around the lower portion of the head rest; so that
   g. the basket is attached to the rear side of the front seat with the top of the basket bearing against the rear side of the head rest and the bottom of the basket bearing against the rear side of the front seat.

2. The litter container as defined in claim 1 further comprising:
   h. a lid hinged to and closing the open top of the basket.

3. The litter container as defined in claim 2 wherein the head rest has:
   i. a post at the lower portion thereof, and said strap extends around said post.

4. The litter container as defined in claim 3 further comprising:
   j. said strap attached to the basket wherein the distance from the strap to the top of the basket is at least ⅓ of the height of the basket.

5. The litter container as defined in claim 4 further comprising:
   k. cup holders in the lid so that beverage containers may be held in the lid of the container when said lid is closed.

6. The litter container as defined in claim 5 wherein said headrest has a top and bottom and a midpoint between said top and bottom of the rear side of the headrest; further comprising:
   l. the top of the basket is located at approximately the midpoint of the rear side of the head rest.

7. The litter container as defined in claim 2 further comprising:
   i. cup holders in the lid so that beverage containers may be held in the lid of the container when said lid is closed.

8. The litter container as defined in claim 1 further comprising:
   h. said strap attached to the basket wherein the distance from the strap to the top of the basket is at least ⅓ of the height of the basket.

9. The litter container as defined in claim 1 wherein the head rest has a post at the lower portion thereof, and said strap extends around said post.

10. The method of attaching a litter basket having a top and a bottom in a vehicle having a front seat having a top, the front seat having a rear side and also having a head rest having a rear side supported by a post onto the top of the seat,
    wherein the method comprises:
    strapping the litter basket to the rear side of the front seat by passing a strap on the litter basket around the post, thus causing the top of the basket to bear against the rear side of the head rest and causing the bottom of the basket to bear against the rear side of the front seat.

11. The method as defined in claim 10 further comprising pivoting a lid to the top of the litter basket.

* * * * *